United States Patent [19]

Riedl et al.

[11] 3,743,995

[45] July 3, 1973

[54] TWO COLOR DETECTOR

[75] Inventors: H. Raymond Riedl, Adelphi; Peter Scharnhorst, Beltsville, both of Md.

[73] Assignee: The United States of America as represented by the Secretary of the Navy, Washington, D.C.

[22] Filed: Mar. 14, 1972

[21] Appl. No.: 234,628

[52] U.S. Cl. ................. 338/15, 96/88, 250/83 R, 252/501, 338/18
[51] Int. Cl. ............................................. H01c 7/08
[58] Field of Search ................. 338/15, 18, 20; 250/83 R, 211 R; 75/134, 166; 252/501, 62.3; 317/234; 136/238, 239; 106/47; 96/88; 29/572, 576

[56] References Cited
UNITED STATES PATENTS

| | | | |
|---|---|---|---|
| 3,224,876 | 12/1965 | Frederick | 75/166 |
| 3,364,014 | 1/1968 | Frederick | 75/134 |
| 3,348,045 | 10/1967 | Brau et al. | 250/83 R |
| 3,511,993 | 5/1970 | Patterson | 250/83 R |

*Primary Examiner*—C. L. Albritton
*Attorney*—R. S. Sciascia et al.

[57] ABSTRACT

A two color detector capable of detecting and distinguishing between two different wavelength bands of electromagnetic radiation, one in the visible — $3\mu$ range and one in the $3\mu - 12\mu$ range, comprising an amorphous film of $[Ge_{1-y}(Pb_{1-x}Sn_x)_y]_z Te_{1-z}$ wherein $0 \leq x \leq 1$, $0 \leq y \leq 1$, $0 \leq z \leq 1$ contacting a material which strongly absorbs radiation in the $3\mu - 12\mu$ wavelength range.

17 Claims, 9 Drawing Figures

3,743,995

TWO COLOR DETECTOR

BACKGROUND OF THE INVENTION

This invention generally relates to detectors and more particularly to a detector which has the capability of detecting and distinguishing between two different wavelengths of radiation.

Heretofore, if one desired to detect and distinguish between two different bands of radiation in two different portions of the electromagnetic spectrum, for example a short wavelength band in the visible to $3\mu$ range and a long wavelength band in the $3\mu - 12\mu$ range, one would use two different detecting devices, each of which was capable of detecting in one of the desired ranges. One could also use a detector which had a wide wavelength response and various transmission filters to achieve the same result. However, it was desirable to have alternate methods of detecting and distinguishing between two different wavelengths of radiation.

SUMMARY OF THE INVENTION

Accordingly, one object of this invention is to provide a detector which is capable of detecting two different wavelength bands of electromagnetic radiation.

A further object of this invention is to provide a detector which is capable of distinguishing between two different wavelength bands of electromagnetic radiation.

A still further object of this invention is to provide a relatively simple detector which is capable of detecting and distinguishing between two different wavelength bands of electromagnetic radiation.

Yet a further object of this invention is to provide a detector which possesses all of the hereinbefore stated properties and which is relatively inexpensive.

Yet a still further object of this invention is to provide a method for detecting two different wavelength bands of electromagnetic radiation with one detector.

These and other objects of this invention are accomplished by providing a detector comprising an amorphous film of $[Ge_{1-y}(Pb_{1-x}Sn_x)_y]_z Te_{1-z}$ wherein $x$, $y$ and $z$ refer to atomic fraction and $0 \leq x \leq 1$, $0 \leq y \leq 1$, and $0 \leq z \leq 1$ contacting a material which strongly absorbs radiation at wavelengths longer than that corresponding to the fundamental absorption edge of the amorphous film henceforth referred to as the long wavelength absorbing material or long wavelength absorber. Thus, $x$, $y$ and $z$ can be any value between 0 and 1 providing that the resultant alloy is amorphous (as opposed to crystalline or polycrystalline) at the operating temperature of the device.

BRIEF DESCRIPTION OF THE DRAWINGS

Still another object and many of the attendant advantages of the present invention will be readily appreciated as the same becomes better understood by reference to the following detailed description when considered in connection with the accompanying drawings in which:

FIGS. 7b, 8, and 9 are diagrams of the type of temporal response curves obtained when the electromagnetic radiation incident on the detectors is chopped as shown in FIG. 7a.

DESCRIPTION OF THE PREFERRED EMBODIMENTS

Figure 1:
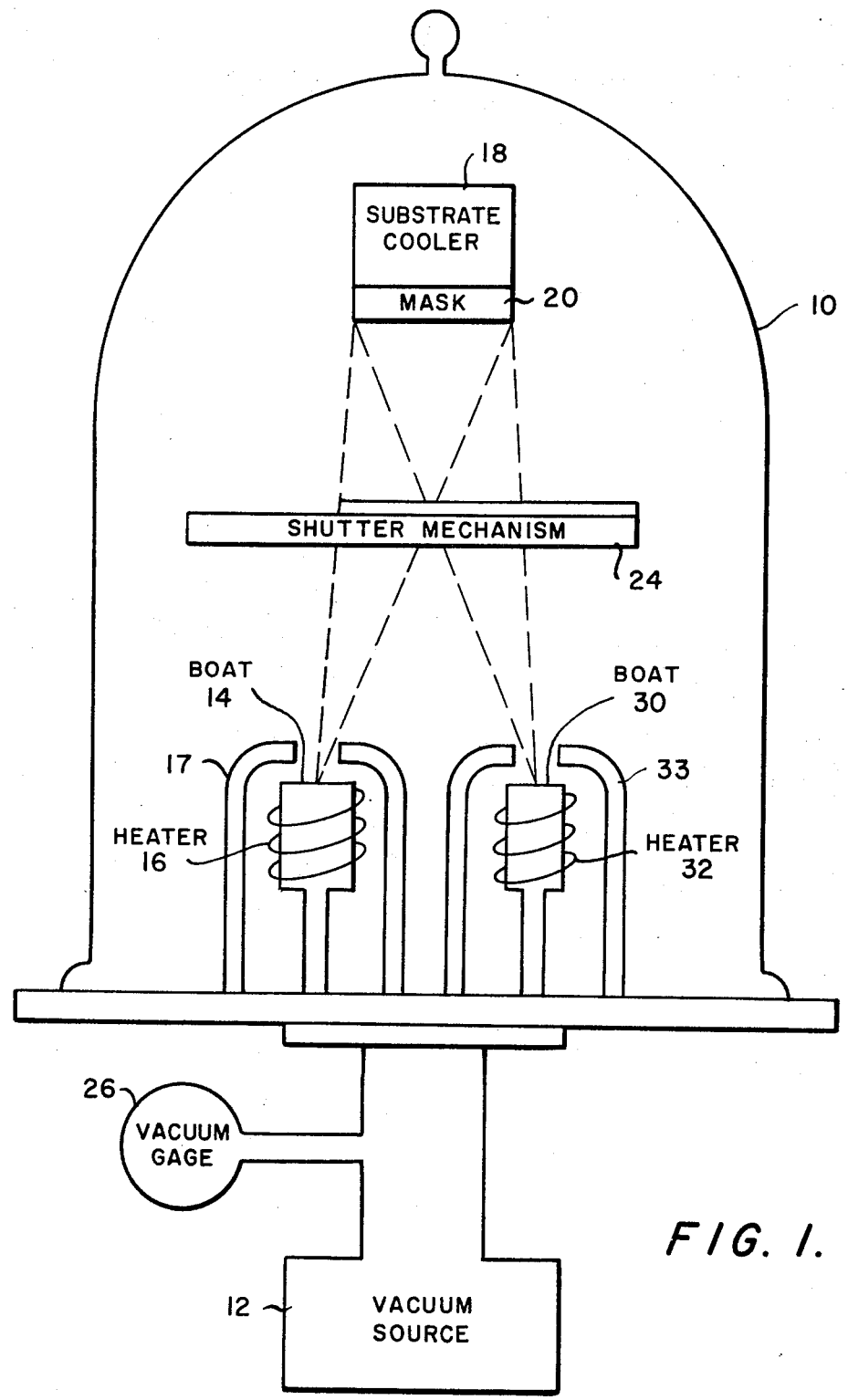
FIG. 1 is a schematic drawing of the apparatus in which the films of this invention may be prepared.

Referring now in greater detail to FIG. 1 of the drawing, the evaporation apparatus, in which the films and articles of this invention are produced, is shown as including a bell jar 10 connected to any standard vacuum source 12. Disposed within bell jar 10 is a first source container, or boat 14, in which one portion of the material to be sublimed is placed and a heater coil 16, which may be made of nichrome for heating the material. It should be noted that the boat is preferably a silica crucible. Water cooling jacket 17 is positioned around the boat 14 in order to keep the heat confined to the boat area. The substrate is placed in a substrate cooler 18 which can be a substrate holder with a liquid nitrogen cooling jacket. Mask 20 is interposed between the substrate and boat 14. A movable shutter mechanism 24 is interposed between mask 20 and boat 14. A vacuum gage 26 is provided to measure the total pressure in the apparatus. Additionally, thermocouples (not shown) can be used to monitor the temperature of the substrate cooler and all the boats. A boat 30 is also disposed in the bell jar 10 to evaporate a second material which is to be deposited on the substrate. Boat 30 also has a heating coil 32 around it which may be made of nichrome. Additionally, water cooling jacket 33 surrounds boat 30 and performs the same function as water cooling jacket 17. As with boat 14, boat 30 is preferably made of silica.

Figure 2:
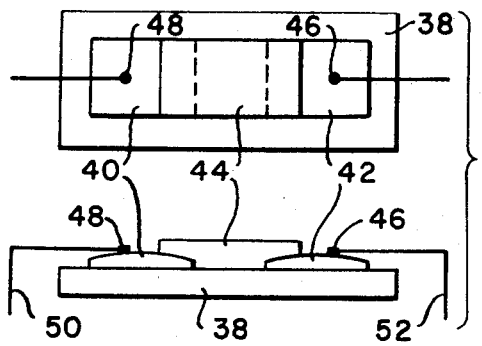
FIG. 2 is a diagram of a detector which can be prepared using the amorphous films described herein with FIG. 2a being a top view and FIG. 2b being a side view.

FIG. 2 is a diagram of a detector which can be made with the amorphous films of this invention. The substrate 38 is covered by two sheets of a conducting material 40 and 42 which can be any electrical conductor but which is preferably gold. Note that there must be a space between the two sheets of the conducting material. These metal sheets are also preferably vacuum vapor deposited onto the glass substrate. Amorphous film 44 is then vapor deposited over a portion of each of the sheets of conducting material and over the space between these two sheets. Lead wires 50 and 52 are cemented to the metal sheets with silver paint or any other conducting glue, 46 and 48. The lead wires 50 and 52 are connected to the appropriate electronics to properly complete the circuit.

Figure 3:
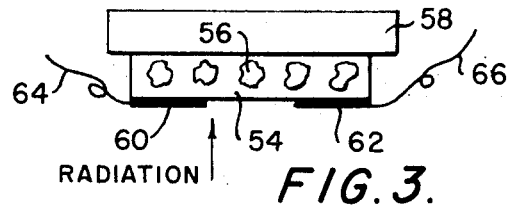
FIGS. 3 and 4 are diagrams of two types of detectors obtained if the long wavelength absorber is co-evaporated into the amorphous film.

FIG. 3 is a diagram of another detector which can be made with the amorphous films of this invention. In this detector, the amorphous film 54 and the long wavelength absorbing material 56 such as a silicon-oxygen based glass are co-evaporated at the same time onto a non-conducting substrate material 58. This coevaporation causes globules of the long wavelength absorbing material to form in the amorphous film. This detector also has two pads of electrically conducting material 60 and 62 in contact with the film as well as electrical lead wires 64 and 66 which are attached to the rest of the detecting electrical circuit.

Figure 4:
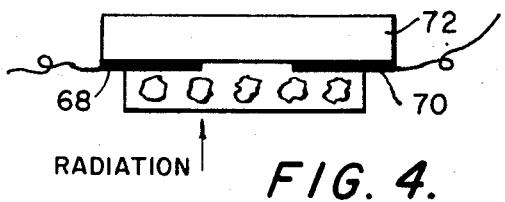

FIG. 4 is the same type of detector as in FIG. 3 except that the two pads of electrically conducting material 68 and 70 are placed between the amorphous film embedded with globules of the long wavelength absorbing material and substrate 72.

Figure 5:
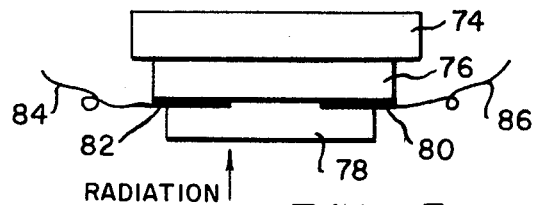
FIG. 5 is a diagram of the type of detector obtained when the long wavelength absorber is evaporated as a film over the amorphous film.

FIG. 5 is another type of detector which comprises a substrate material 74 contacting the amorphous film 76. In this detector, the long wavelength absorbing material 78 which contacts the amorphous film may also be a film. Two pads of electrically conducting material 80 and 82 are interposed between the amorphous film and the long wavelength absorbing film. These pads are connected to electrical leads 84 and 86 which lead to the rest of the detector.

It should be noted that with the detectors of FIGS. 3, 4 and 5, the substrate material must be non-conducting lest it short out the device. Furthermore, the substrate should not be absorbing for wavelengths longer than those wavelengths which are strongly absorbed by the amorphous material, lest the resultant electrical signal be confused with that produced by the long wavelength absorber.

Within the context of this invention, the term "long wavelength" is defined as any wavelength that is longer than the longest wavelength strongly absorbed by conduction-valence band transitions in the amorphous film. In some device configurations, such as FIG. 2, the long wavelength absorber must also be non-conducting. However, in the configurations of FIGS. 3 and 4, it may be conducting.

Furthermore, within the context of this invention, the term "substrate" is defined as the material upon which the film is deposited. In all of FIGS. 2 through 5, the substrate must be non-conducting although there might be configurations where it may be conducting. In FIG. 2, the substrate also acts as the long wavelength absorber while in FIGS. 3 and 4 and 5 it acts only as a substrate.

Figure 6:
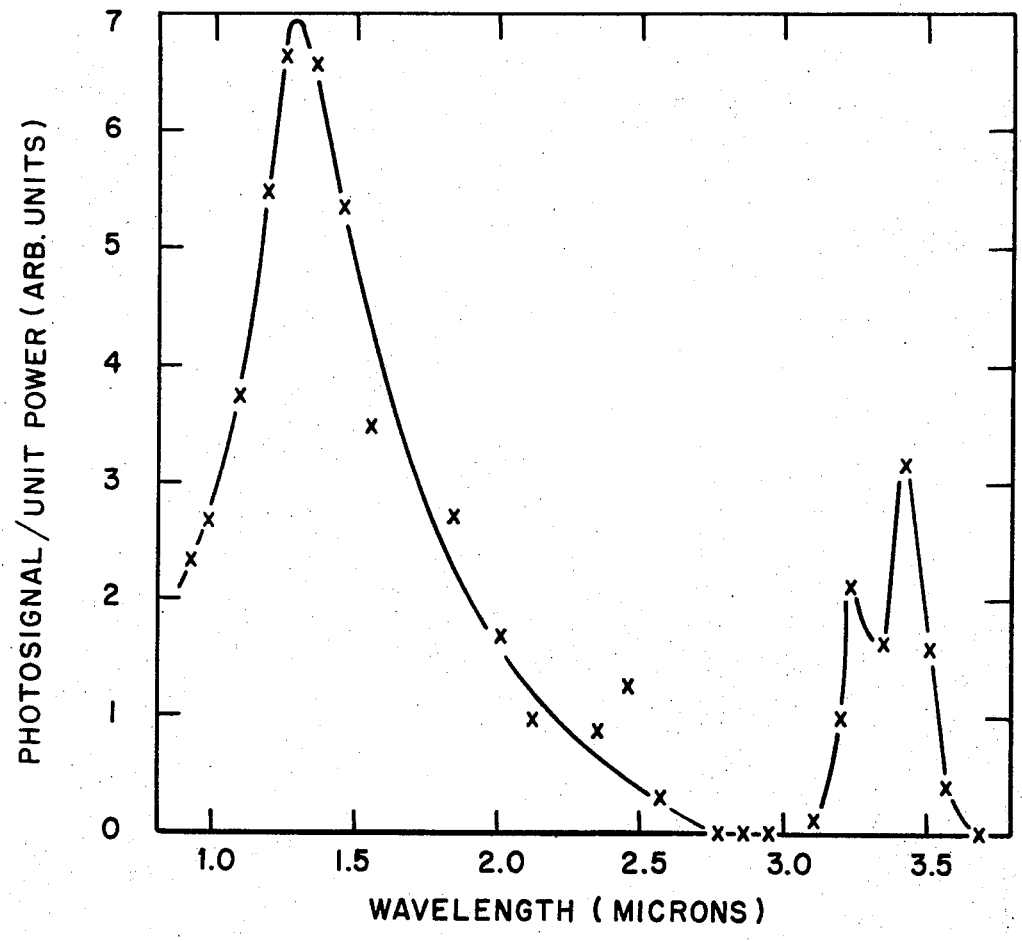
FIG. 6 is a spectral response curve for a particular embodiment of this invention.

FIG. 6 is a graph of the spectral response for a typical detector. It will be noted that one response is in the 1.5 micron region and is due to the intrinsic, band-to-band, photoresponse of the semiconducting film while the other response in the 3.5 micron region is due to the bolometric effect, involving both the amorphous film and the long-wavelength absorbing material.

Figure 7:
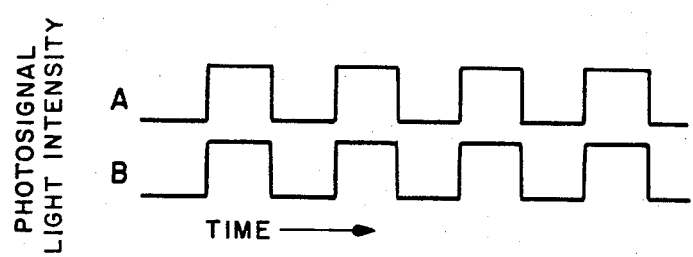

FIG. 7b is a diagram of the type of temporal response curve one would obtain from the intrinsic band-to-band photoresponse of the amorphous film if the radiation were chopped so as to produce square pulses of radiation, as shown in FIG. 7a.

Figure 8:
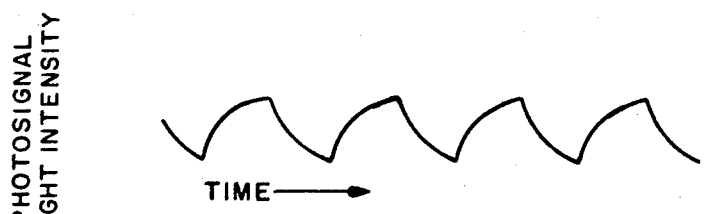

FIG. 8 is a diagram of the type of response curve one would obtain from the bolometric effect response for the same pulsed light environment depicted in FIG. 7a.

Figure 9:
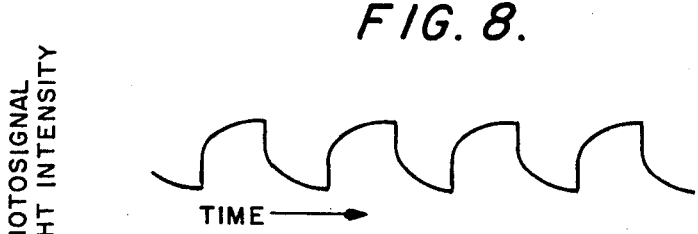

FIG. 9 is a diagram of the curve one would obtain when both the intrinsic effect and the bolometric effect are carried at the same time when the incident radiation is chopped as shown in FIG. 7a.

The two color photosensitivity of the detector results from two different physical phenomena, each associated with a characteristic wavelength band. Herein lies the essense of the two color capability. For one, photosensitivity results from optical transitions of current carriers into more highly conducting states, thereby increasing the electrical conductivity. There is a rather sharp, minimum threshold photon energy required to do this, resulting in a rather well-defined wavelength band of photosensitivity (in the visible - $3\mu$ range).

The other phenomenon is a bolometric effect. The photosensitivity from this effect results from radiation-induced heating of the amorhpous film which, because of the temperature dependence of the electrical conductivity, results in an electrical signal. More specifically, the radiation used here is of longer wavelength (in the $3\mu - 12\mu$ range), or of smaller photon energy than the minimum energy required for the hereinbefore described process. The amorphous film is rather transparent to these wavelengths and the radiation is transmitted through the film and into the substrate, where it is absorbed. In this case, the substrate is the long wavelength absorber. A substrate is chosen so as to have strong absorption in the wavelength band of interest. This strongly absorbed radiation heats the film-covered surface of the substrate which in turn heats the film, and results in the electrical signal. The substrate should have an absorption coefficient of $10^3 cm^{-1}$ or greater at the wavelengths which are to be detected, with absorption coefficients of $10^4 cm^{-1}$ or higher being preferred. The substrate should also have a thermal conductivity of less than 100 milliwatts/(cm$^{20}$K) and an electrical conductivity which is at least a factor 10 less conductive than the film and is preferably at least a factor of 100 less conductive than the film. In general, any material, other than the amorphous semiconductor film, which because of the particular geometrical sample configuration, can provide a continuous electrical path from one electrode to the other, should be at least a factor of 10 less conducting than the amorphous semiconducting film, and preferably a factor of 100 or more less conducting than said film.

Using a glass substrate as an example one would prepare the detectors of this invention by evaporating an electrically conductive material onto the surface of the glass using any standard evaporator similar to that shown in FIG. 1. It is necessary to evaporate onto the glass at least two separate and distinct electrodes of electrically conducting material so that there is a gap between these two elements. The preferred electrode material is gold. These electrodes are represented by 40 and 42 in FIG. 2.

Once these are affixed to the glass substrate the amorphous film is then evaporated onto the substrate so that the film fills the gap between the two electrodes and touches the glass substrate itself. It should be noted that the amorphous film will also be in contact with both of the electrically conducting electrodes. The amorphous film is deposited onto a substrate maintained at or below room temperature. The amorphous films that have been found to work as detectors fall within the limits of the formula $[Ge_{1-y}(Pb_{1-x}Sn_x)_y]_z Te_{1-z}$ wherein $0 \leq x \leq 1$, $0 \leq y \leq 1$ and $0 \leq z \leq 1$. The important factor is not necessarily the exact composition of the film but rather that it be an amorphous film. The preferred films however are those wherein $z$ is about 0.50 while the most preferred values of $y$ and 0.04 - 0.35 and the most preferred values of $x$ are 0.1 - 0.30.

After the amorphous film has been evaporated onto the substrate one need only add one drop of silver paint 46 and 48 on each of the exposed portions of the electrodes in order to attach electrical leads to the detector. Those skilled in the art of course realize that many electrically conducting cements can be used in place of the silver paint since the only function of the material is to secure the electrical leads to the electrically conducting electrodes of the detector while maintaining electrical continuity between the electrodes and the lead wires.

EXAMPLES

The fabrication of the detector is as follows:

Two electrically conducting electrodes made of gold, separated by a 0.1mm wide channel between the electrically conducting electrodes are evaporated onto a 1mm thick silicon-oxygen based glass substrate. Next the amorphous compound film is evaporated spanning the channel between the electrically conducting electrodes. During deposition the substrate temperature is not higher than 300° K and the pressure in the vacuum system is about $10^{-7}$ torr. The desired compound $[Ge_{1-y}(Pb_{1-x}Sn_x)_y]_{.50}$ $Te_{.50}$ is synthesized during condensation from the vapor phase by mixing two independently controlled molecular beams of GeTe and $Pb_{1-x}Sn_x Te$. The desired composition "y" is achieved by adjusting the evaporation rates. The maximum condensation rate per constituent is about 5 A/sec at a distance of about 10 cm from the source. Both GeTe and $Pb_{1-x}Sn_xTe$ are evaporated from silica boats.

Typical devices which have been prepared are as follows:

$[Ge_{1-y}(Pb_{.80}Sn_{.20})_y]_{.50}Te_{.50}$

| y | Substrates |
|---|---|
| 0.14 | Corning No. 2950 glass |
| 0.0 | " |
| 0.20 – 0.30 | " |
| 0.14 | Lucite (polymethyl methacrylate) |

Various other long wavelength absorbor-substrates may also be used in place of the glass and lucite shown above. Thus other plastics, wood products, paint-covered glasses and plastics and metals may be used as long as they are good electrical insulators and have absorption coefficients of $10^3$ $cm^{-1}$ or greater in the desired spectral region. The typical spectral response curve obtained from these detectors is represented in FIG. 6.

It should be noted that within the scope of this invention the term "glass" is meant to refer to glass which contains Si-O bonds. It should also be noted that detectors which are amorphous films similar to those used in the instant invention and glass substrates have been disclosed in Ser. No. 234,627, entitled Electro-Optical Detector by Peter Scharnhorst filed on the same date herewith and hereby incorporated by reference.

Detection of the two different wavelength bands of radiation may be accomplished in a number of ways. This electronic gear may be connected to the two lead wires and arranged in such a way as to be able to distinguish between electromagnetic radiation in the two desired regions.

For instance, a simple method of detection can be developed by making use of the fact that the intrinsic, film photoresponse at short wavelengths is very fast relative to the slower bolometric effect. Thus if one were to chop the radiation incident on the detector, so as to produce square pulses of radiation as shown in FIG. 7a, the waveforms of the electrical signal from the detector would be sharp, as shown in FIG. 7b. The bolometric effect detection however takes a longer period of time to build up to maximum signal and one would obtain electrical waveforms such as depicted in FIG. 8. Naturally the film detection would be responsive to electromagnetic radiation in the visible to $3\mu$ range while the bolometric effect detection would respond to electromagnetic radiation in the $3\mu$ to $12\mu$ range.

If both long and short wavelength radiation is incident on the detectors of this invention at the same time one would obtain a signal such as in FIG. 9 when the incident radiation is chopped as shown in FIG. 7a. This signal is easily distinguishable from those of FIGS. 7b and 8 because it contains characteristics of both of those signals. Thus the response is initially sharp due to the amorphous film detection and then it takes on a cruved configuration when the bolometric effect response becomes substantial. When the incident radiation is blocked from the detector the response abruptly falls off because the initial response of both effects is fast, but the slower bolometric effect soon dominates the signal, resulting in the waveform characteristic of the slower response, as depicted in FIG. 8. Thus the type of response curve obtained has the sharp response of the amorphous film detector as well as the slower response of the bolometric effect detectors.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A two-color detector element comprising:

an amorphous film of $[Ge_{1-y}$ $(Pb_{1-x}Sn_x)_y]_2$ $Te_{1-z}$ wherein $0 \leq x \leq 1, 0 \leq y \leq 1$ and $0 \leq Z \leq 1$ and a long wavelength absorbing material in contact with said film, having an absorption coefficient of no less than about $10^3$ $cm^{-1}$ and a thermal conductivity of no greater than about 100 milliwatts/($cm^2$ ° K)

provided that said long wavelength absorbing material is other than silicon-oxygen based glass.

2. The two-color detector element of claim 1 wherein said long wavelength absorbing material is also a substrate.

3. The two-color detector of claim 1 wherein y is 0.04 – 0.35, x is 0.1 – 0.3 and z is about 0.5.

4. The two-color detector of claim 2 wherein y is 0.04–0.35, x is 0.1 – 0.3 and z is about 0.5

5. The two color detector element of claim 1 wherein said long wavelengths absorbing material is present as globules contained in said amorphous film.

6. The two-color detector element of claim 3 wherein said long wavelength absorbing material is present as globules contained in said amorphous film.

7. The two-color detector element of claim 1 wherein said long wavelength absorbing material is polymethyl methacrylate.

8. The two-color detector element of claim 2 wherein said long wavelength absorbing material is polymethyl methacrylate.

9. The two-color detector element of claim 3 wherein said long wavelength absorbing material is polymethyl methacrylate.

10. The two-color detector element of claim 4 wherein said long wavelength absorbing material is polymethyl methacrylate.

11. In the method of detecting and distinguishing between two different wavelength bands of electromagnetic radiation, one in the visible $-3\mu$ range and one in the $3\mu-12\mu$ region the improvement comprising using a two-color detector element comprising:
  an amorphous film of $[Ge_{1-y} (Pb_{1-x} Sn_x)_y]_z Te_{1-z}$ wherein $0 \leq x \leq 1$, $0 \leq y \leq 1$ and $0 \leq Z \leq 1$ contacting
  a long wavelength absorbing material having an absorption coefficient of no less than about $10^3$ cm$^{-1}$ and a thermal conductivity of no greater than about 100 milliwatts/(cm$^2$ $^\circ$ K).

12. The method of claim 11 wherein said long wavelength absorbing material is silicon oxygen based glass.

13. The method of claim 11 wherein said long wavelength absorbing material is also the substrate.

14. The method of claim 13 wherein said long wavelength absorbing material is also the substrate.

15. The method of claim 11 wherein said long wavelength absorbing material is polymethyl methacrylate.

16. The two-color detector element of claim 1 which additionally comprises two non-adjacent electrodes which are bridged by the amorphous film
  provided that when a material other than the amorphous film bridges the two non-adjacent electrodes said material has an electrical conductivity that is a factor of 10 less than said amorphous film.

17. The method of claim 11 wherein the two-color detector element additionally comprises two non-adjacent electrodes which are bridged by the amorphous film
  provided that when a material other than the amorphous film bridges the two non-adjacent electrodes said material has an electrical conductivity that is a factor of 10 less than said amorphous film.

* * * * *